United States Patent [19]

Bommier et al.

[11] Patent Number: 5,643,663
[45] Date of Patent: Jul. 1, 1997

[54] CARBON-CARBON COMPOSITE FRICTION MATERIAL WITH DIVIDED POROSITY

[75] Inventors: Christophe Bommier, Paris; Jean-Louis Chareire, Levallois-Perret, both of France

[73] Assignee: Le Carbone Lorraine, Courbevoie, France

[21] Appl. No.: 502,943

[22] Filed: Jul. 17, 1995

Related U.S. Application Data

[63] Continuation of Ser. No. 95,220, Jul. 23, 1993, abandoned.

[30] Foreign Application Priority Data

Jul. 23, 1992 [FR] France .................................. 92 09331

[51] Int. Cl.⁶ .................................................. B32B 5/72
[52] U.S. Cl. .......................... 428/317.9; 428/304.4; 428/311.51; 428/316.6; 428/311.11; 428/317.9; 192/107 C; 192/107 M; 192/107 R
[58] Field of Search ................................ 428/224, 252, 428/245, 304.4, 311.5, 316.6, 317.9, 408, 490, 902, 908.8, 284, 292, 258, 298, 311.1; 128/250, 251 A, 251 R; 192/107 M, 107 R, 107 C

[56] References Cited

U.S. PATENT DOCUMENTS

| | | | |
|---|---|---|---|
| 3,573,086 | 3/1971 | Lambdin et al. | 117/46 |
| 3,908,061 | 9/1975 | Byrne et al. | 428/288 |
| 3,991,248 | 11/1976 | Bauer | 428/245 |
| 4,318,948 | 3/1982 | Hodgson | 428/68 |
| 4,748,079 | 5/1988 | Thebault . | |
| 5,198,152 | 3/1993 | Lumatta et al. | 252/389.31 |
| 5,242,746 | 9/1993 | Bommier et al. | 428/252 |

FOREIGN PATENT DOCUMENTS

| | | |
|---|---|---|
| 1264724 | 10/1984 | France . |
| 1203267 | 9/1988 | Japan . |
| 1163979 | 3/1967 | United Kingdom . |
| 1163979 | 9/1969 | United Kingdom . |
| 2004855 | 4/1979 | United Kingdom . |

OTHER PUBLICATIONS

Japan Abstract, 63 182 256, Jul. 27, 1988 (Derwent).
Japan Abstract, 12 03 267, vol. 13, No. 504, Nov. 13, 1989.
Japan Abstract, 2 167 859, Jun. 28, 1990. (Derwent).

*Primary Examiner*—Merrick Dixon
*Attorney, Agent, or Firm*—Dennison, Meserole, Pollack & Scheiner

[57] ABSTRACT

A carbon-carbon composite material formed from a fibrous substrate and a matrix. The fibrous substrate has a carbon fiber base which acts as a reinforcement, a coarse texture and large sized cavities. The matrix includes pyrocarbon layers coating the fibrous substrate and a carbon based cellular structure dividing the large sized cavities of the substrate into small cavities having open porosity.

10 Claims, 3 Drawing Sheets

1000 μm

CARBON-CARBON COMPOSITE FRICTION MATERIAL WITH DIVIDED POROSITY

This is a continuation of application Ser. No. 08/095,220 filed on Jul. 23, 1993 now abandoned.

BACKGROUND OF THE INVENTION

The invention relates to the domain of carbon-carbon (abbreviated as C-C) composite friction materials.

DESCRIPTION OF RELATED ART

A great number of types of C-C composite materials already exist which are used as friction materials and which differ from one another either by the matrix, or by the substrate which acts as a fibrous reinforcement, or by both.

Generally speaking, the fibrous reinforcement can be characterised by a large number of parameters, such as the type of fiber (origin, ex-PAN fiber, ex-pitch fiber in the pre-oxidised/carbon-based/graphited state), all the physical parameters relating to individual fibers (length, diameter . . . ), to groupings of individual fibers into roves (number of individual fibres per rove), to the arrangement of individual fibers or of roves in the form of a woven or non-woven substrate, to the arrangement of layers of the substrate which is woven or otherwise, to means for joining together the layers, such as tufting, etc . . .

The carbon based matrix which bonds together the carbon fibers or roves is usually produced by depositing carbon in the substrate in the typically compressed state, either by depositing pyrocarbon by chemical depositing in vapour phase, by impregnation of the pitch or resin and carbonation, or by a combination of these two methods.

Depending on the type of fibrous substrate, a C-C composite of variable texture is obtained.

The terms, "fine texture" or "coarse texture" are used to describe respectively:

- C-C composites obtained from a compressed fibrous substrate which is constituted of a mat surface of individual fibres, a felt, with the individual fibres which may be cut to a short length (<0.5 mm) being distributed homogeneously. In this case, the substrate is so finely distributed that there is almost no element of cubic volume greater than or equal to 100 µm·100 µm·100 µm not containing carbon fibers, whether inside the substrate in the compressed state or in the final composite. See FIG. 1a.

- C-C composites obtained from a compressed fibrous substrate, constituted of fabrics of carbon fiber roves, with random distribution of the rove segments (roves cut to a length of >0.5 mm), each rove containing at least a thousand individual fibers. In this case, the substrate is distributed relatively coarsely, in such a way that there are many elements of cubic volume greater than or equal to 100 µm·100 µm·100 µm which do not contain any carbon fibers, whether inside the substrate in the compressed state or in the final composite. See FIG. 1b.

The person skilled in the art already knows the effects of the type of matrix on the properties of the C-C composites used as the friction material.

Generally speaking, if a comparison is made between densifying a substrate by chemical deposit in vapour phase (formation of pyrocarbon, most frequently rough laminar) or by impregnation with a resin with a high carbon content, when densification is by chemical deposit in vapour phase, a deposit of pyrocarbon is obtained on the fibers, and the pyrocarbon is greatly oriented and thus very much capable of graphiting which results in a C-C composite which is relatively heat-conductive, even without a graphiting treatment. See FIG. 1c.

On the other hand, when the impregnation of the resin is followed by carbonation, a carbon deposit is obtained which is very non-oriented, and which is not very capable of being graphited and which has a spatial distribution which is completely different from that obtained by chemical deposit in vapour phase, as can be seen in FIG. 1e. The C-C composites thus obtained are not good heat conductors, even after graphiting, for they contain hard carbon particles which have a low graphiting capacity, and which are properly linked to the fibrous substrate, which imparts upon them a good resistance to wear if they are rubbed against one another.

Moreover, the use of C-C composites as friction materials means, as is known to those skilled in the art, that the C-C composite has the following properties in order of importance:

- good mechanical properties, and, in particular, a good resistance to impact, the brake disc being a mechanical member which transmits an important braking couple—a couple which occurs very suddenly at the start of the braking operation.
- satisfactory friction properties, in particular great stability of the coefficient of friction during one and the same brake application.
- and good resistance to wear (this is mostly an advantage in terms of cost).

The Applicant has noted that if a C-C composite friction material is used, effects were produced which conflicted with the operating factors, in such a way that it was difficult, if not impossible, to simultaneously obtain properties which are desirable for a friction material.

Thus, as far as the effects of the texture of the C-C composite are concerned, the mechanical properties, and, in particular, the behaviour to impact of a composite of coarse texture is better than that of a composite of fine texture. On the other hand, the rate of wear is usually less with a fine texture.

Likewise, as far as the type of carbon based matrix is concerned, a pyrocarbon matrix results in a coefficient of friction which is usually more stable than a matrix obtained by the impregnation of a resin. On the other hand, at least under non-oxidising braking conditions (temperature <600° C.), a composite with a pyrocarbon matrix wears out more quickly than a matrix obtained by resin impregnation.

As for mixed matrices obtained by densifying the fibrous substrate through chemical deposit in vapour phase and impregnation, these matrices have not resulted, using known manufacturing methods, in a C-C composite with improved friction properties.

The Applicant has therefore investigated implementing a C-C composite material which is particularly well-suited as a friction material.

SUMMARY OF THE INVENTION

In accordance with the invention, the carbon-carbon composite material comprises a fibrous substrate with a carbon fibre base which acts as a reinforcement and a carbon matrix comprising pyrocarbon, and is characterised in that, a) said fibrous substrate has a coarse texture with large-sized cavities, b) said matrix comprises carbon based coating layers of said pyrocarbon fibrous substrate and a carbon based cellular structure which divides said large sized cavities in such a way as to form small open porosity cavities.

The Applicant has noted that it was essential in order to satisfy the aims of the present application:

firstly, to start with a coarse textured substrate, in order to confer high mechanical performances upon the final C-C composite, in particular a high resistance to impact (resilience), secondly, to carry out an initial partial densifying operation by chemical deposit in vapour phase, in such a way as to mechanically link the fibrous substrate, whilst permitting open porosities of large magnitude to remain, finally, to divide these open porosities of large magnitude by forming a carbon based cellular structure constituted of a support of carbon material coated with pyrocarbon, this latter point being particularly important to achieve the aims of the invention, and constituting an essential feature of the invention.

DETAILED DESCRIPTION OF THE INVENTION

According to the invention, the walls (8) of said cellular structure comprise, at the core, a non-oriented carbon based material, and, at the surface, an oriented material of the pyrocarbon type which is joined to said coating layers (40).

Figure 1A:
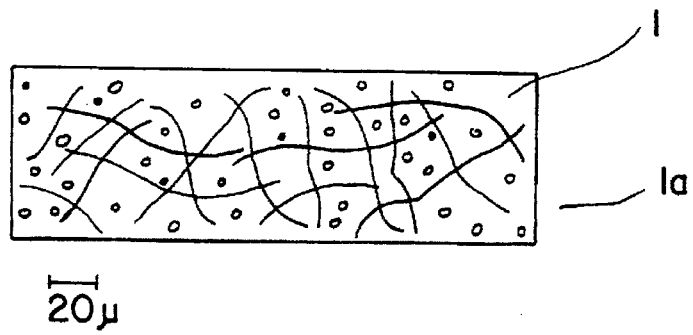
FIGS. 1a and 1b are diagrams showing, respectively, a substrate of fine texture (1) constituted of an array of carbon fibers (1a), a substrate of coarse texture (2) (fabric of carbon fiber roves (2a)) with large size cavities (3).
Figure 1B:
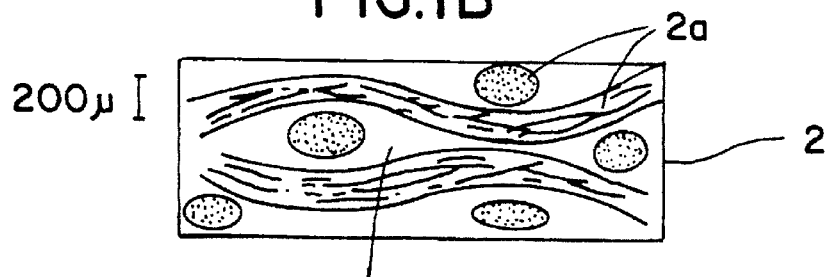
Figure 1C:
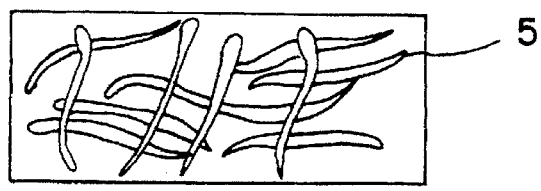
FIGS. 1c and 1d show a C-C composite (5) obtained by depositing pyrocarbon, FIG. 1d showing that the pyrocarbon is deposited by depositing successive pyrocarbon layers on the surface of the carbon fibers.
Figure 1D:
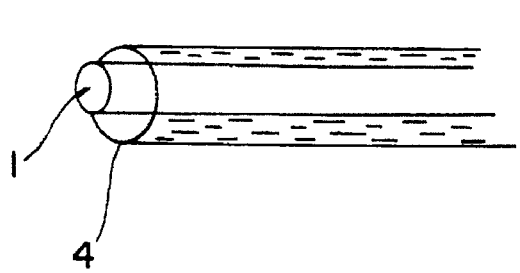
Figure 1E:
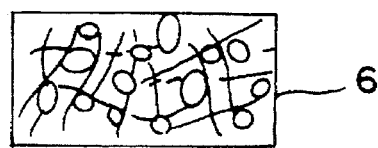
FIGS. 1e and 1f show a C-C composite (6) obtained by impregnation of resin and carbonation. In this case, carbon particles are formed which are "hooked" onto the fibers and distributed in the fibrous substrate.
Figure 1F:
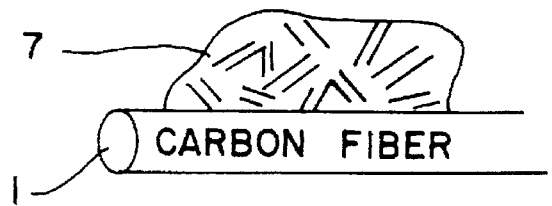
Figure 2:
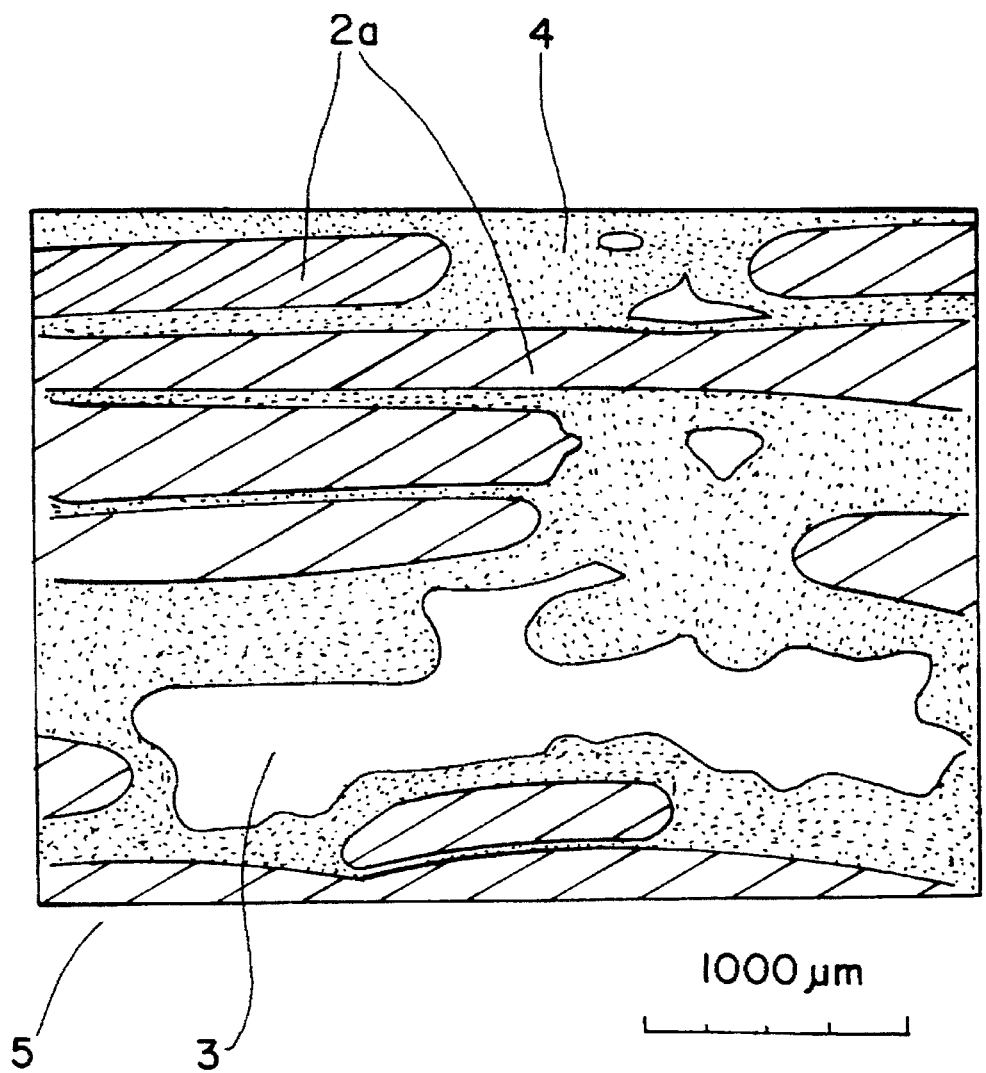
FIG. 2 is a diagram corresponding to a photograph of a composite profile (5) which has been used to carry out all the tests according to the invention and which is constituted of a substrate of coarse texture formed of roves (2a), covered over with pyrocarbon layers (4). On this cut it is possible to observe a large sized cavity (3) which is greater than 3 mm in length.
Figure 3:
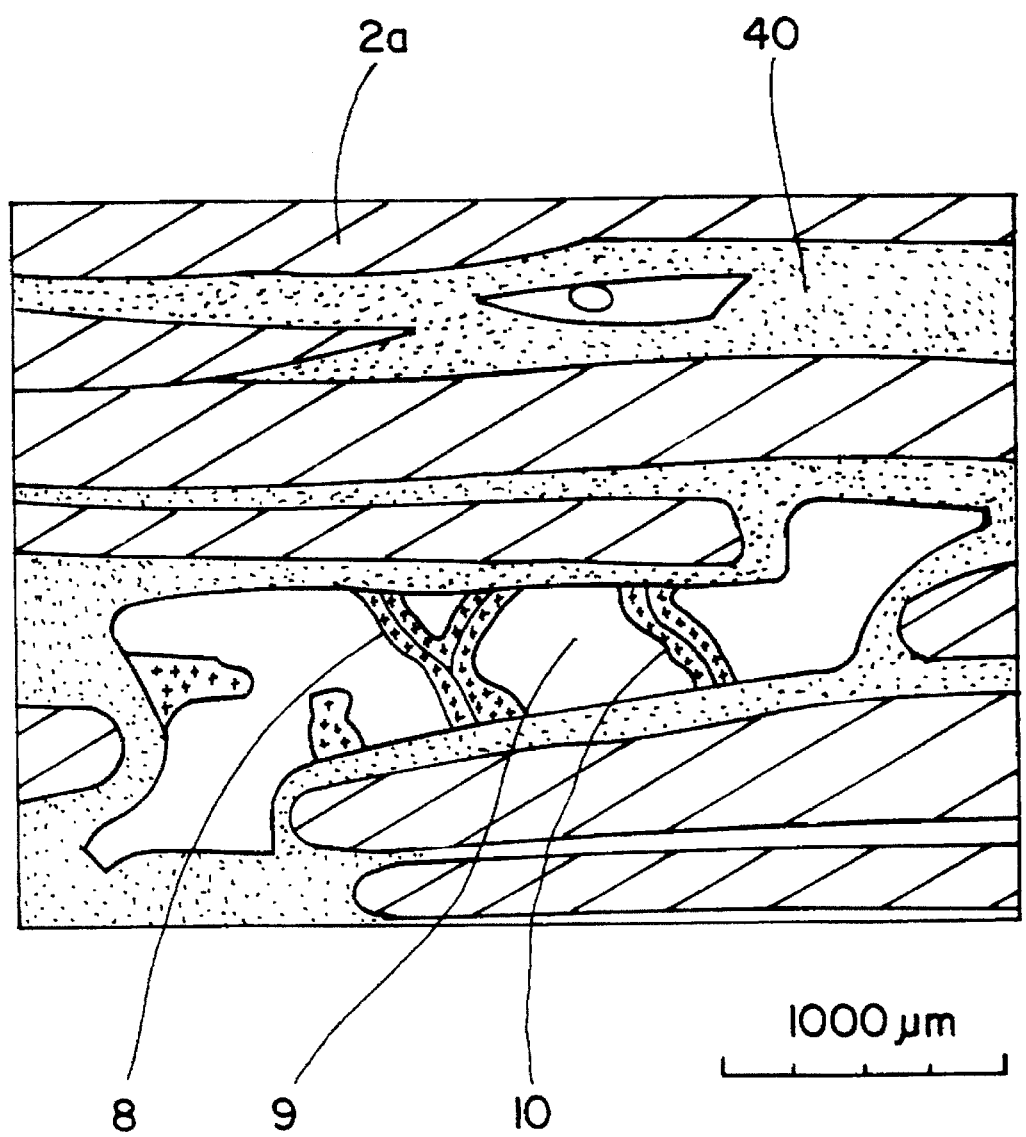
FIG. 3 shows a C-C composite according to the invention and is a diagram corresponding to a photograph of a section of the composite (5) after the formation of said cellular structure which results in the formation of small sized cavities (9): The substrate of roves (2a) is marked by diagonal lines, and the pyrocarbon (40) forming the carbon based coating layers is shown by dots, whilst the walls (8) of said cellular pyrocarbon structure are shown by crosses. The walls have a central part (core), shown by a solid line (10) corresponding to the initial support constituted of carbon based particles which are bonded to varying degrees and on which the pyrocarbon is deposited.

FIG. 3 clearly illustrates the structure of the walls according to the invention: the core (10) made of a non-oriented carbon based material has a part of the wall (8) which is low in terms of percentage by weight or volume which is mainly made of pyrocarbon. For the sake of clarity, FIG. 3 clearly shows the pyrocarbon (40) (dots) which coats the substrate of coarse texture (2a) and the pyrocarbon of the walls (8) (with crosses), but there is, in fact, no discontinuity between the pyrocarbon layers which form the walls and the surface layers of pyrocarbon coating the substrate of coarse texture, as will become apparent if reference is made to the manufacturing process: In the illustration, and as will be described in greater detail hereinafter, the pyrocarbon (40) which coats the substrate of coarse texture according to the invention is deposited in two stages, in a first stage during the initial densifying of said fibrous substrate (reference (4) for the pyrocarbon), and a second time after formation of said non-oriented carbon based material (10) during formation of said cellular structure. It will therefore be appreciated that the pyrocarbon forming said walls (8), when the process according to the invention is used, has to be joined to the pyrocarbon which coats said fibrous substrate.

According to the invention, said non-oriented material at the core results from carbonation of a carbon-rich resin, or a pitch, or a heavy hydrocarbon, or a film-forming material.

The C-C composite material according to the invention, with said cellular structure, is of the following composition (% by volume):

| | |
|---|---|
| fibrous substrate | between 20 and 40% vol. |
| pyrocarbon coating | between 40 and 60% vol. |
| carbon based cellular structure | between 5 and 20% vol. |
| residual porosity | between 5 and 15% vol. |

According to the invention, said fibrous substrate (2a) of coarse texture is constituted of carbon fiber roves containing more than 1000 filaments either in the form of fabrics, or in the form of roves cut to lengths greater than 3 mm and distributed at random, the intersections of the roves or accumulations of them resulting in porosities of a section which is at least equal to $10^{-1}$ mm$^2$.

The coating layers (40) of pyrocarbon are between 50 and 100 μm in thickness. The transverse carbon based walls which form said cellular structure and which divide said large sized cavities are between 10 and 60 μm in thickness and lead to the formation of small sized cavities with a mean profile of between $10^{-2}$ and $10^{-1}$ mm$^2$ in section.

The material according to the invention is graphited, or otherwise, in accordance with the conditions of use during braking.

Another aim of the invention is a process for the manufacture of a carbon-carbon (C-C) composite material by densifying a fibrous substrate of carbon fibers or of carbon fiber forerunners, comprising a densifying step by formation of pyrolytic carbon, and characterised in that:

a) a fibrous substrate of coarse texture is selected and compressed in such a way as to obtain a voluminal rate of substrate of between 20 and 40%, b) partial densifying by depositing pyrocarbon on said fibrous substrate of coarse texture in such a way as to form pyrocarbon layers coating the fibrous substrate and in such a way as to thereby ensure sound cohesion of the fibrous substrate, and in such a way as to form a C-C composite with a pyrocarbon voluminal rate of between 40 and 60% and comprising large sized oblong cavities with open porosity, c) a cellular structure is formed by initially impregnating the material obtained in step b) with a solution which is diluted with a substance selected from the group formed by a carbon-rich resin, a pitch, a heavy hydrocarbon, or a film-forming substance, and then, after polymerisation and/or carbonation of said substance, depositing the pyrocarbon to form a bond with said pyrocarbon layers, with a voluminal rate of between 5 and 20%, in such a way as to sub-divide said large sized cavities and to obtain a rigid C-C composite with small sized cavities and with open porosity of between 5 and 15% (%v).

At stage c) of the process, the core of said cellular structure is formed by impregnation of the C-C composite obtained in step b) with a liquid solution, preferably aqueous, which is diluted with a substance capable of forming, after the volatile elements have been removed from said liquid solution and after carbonation, arrangements of material which are typically bi-dimensional and similar to a wall of small thickness, typically less than 1 μm in thickness.

The substance used in step c) is selected from organic polymeric substances of natural or synthetic origin, which are preferably soluble in water.

As already stated, in step c) of the process, a cellular structure is formed, the walls of which are mainly constituted of pyrocarbon and which are between 10 and 60 μm in thickness, the walls being joined integrally to the pyrocarbon layers coating the fibrous substrate.

Depending on the application, particularly when the braking conditions increase the temperature of the friction materials to above 600° C. for a relatively long period of time, it is possible to subject said C-C composite obtained in step c) of the process to a graphiting treatment.

EXAMPLES 3 comparative tests are described. Tests 1 and 2 are carried out in accordance with the prior art and Test 3 is carried out in accordance with the invention. All tests 1 to 3 are carried out starting with one and the same C-C composite material with a base obtained in the following manner:

- a fibrous substrate is manufactured by cutting roves constituted of 3000 ex-PAN carbon fiber filaments, 40 mm in length, in such a way as to obtain a random distribution of roves mainly oriented in horizontal planes, then the cut roves are compressed in such a way as to obtain a voluminal rate of fibers of 30%. At this stage, the fibrous substrate is characterised by very coarse porosities (presence of large sized cavities exceeding 0.1 mm$^2$ in section).
- the fibrous substrate (kept compressed) thus prepared is partially densified by depositing pyrocarbon until a material is obtained with a density of 1.65. This usually corresponds to pyrocarbon being deposited around the roves to a depth in the order of 50 μm. This thickness is small if compared to the sizes of the large size cavities which are oblong cavities, typically 1 mm in length of more for a width of 0.2 mm, so that the size of the large sized cavities present in the substrate is not significantly reduced by the partial densifying.

The C-C composite is thus obtained with a base which was used in tests 1 to 3.

Example 1

Densifying the base C-C composite by depositing supplementary pyrocarbon to obtain a density of 1.75. A C-C composite is obtained (test 1) which is similar to the base C-C composite, with only pyrocarbon coating layers a little thicker.

The material obtained, of density 1.75, ends up being subjected to a heat treatment at 2400° C.

Example 2

The base C-C composite is impregnated with a pitch, and then the whole is carbon based. A C-C composite is obtained of density 1.75 (test 2) and it is noted that the initial large sized cavities contain large particles of solid carbon, without being linked to the pyrocarbon coating layers. As for the material in Example 1, a final heat treatment at 2400° C. is carried out on the material.

Example 3

The base C-C composite is impregnated with an aqueous solution diluted with 10% by weight phenolic resin. After the water evaporates, and after polymerisation at ambient temperature and carbonation, a C-C composite is obtained in which the initial large-sized cavities contain small carbon based particles which are bonded together to varying degrees in a bi-dimensional arrangement (10) (core of cellular structure) which divide up said initial large sized cavities. A second stage is then carried out where the carbon (pyrocarbon) is deposited by gaseous method onto all accessible surfaces, thus including said bi-dimensional arrangement (core), in such a way as to form a cellular structure with walls (8) (core coated with pyrocarbon) bonded to the walls of the initial large sized cavities.

Typically, the walls of the cellular structure are 40 μm in thickness (large majority pyrocarbon) and are perfectly joined to the pyrocarbon layers which cover the roves, so that the coarse porosity of the initial C-C composite is replaced by a fine porosity (cellular) but one which is still open. A C-C "partitioned" composite is thus obtained, with a density of 1.75 (test 3). As for Examples 1 and 2, the material obtained is subjected to a final heat treatment at 2400° C.

CHARACTERISTICS OF PREPARED C-C COMPOSITES

Brake discs (diameter 120/100 mm) are manufactured from each C-C composite in Examples 1 to 3.

Test Conditions:

2 discs (same C-C composite) which rub against each other are used to stop a flywheel of ineptness (3.5 kg.m$^2$) under various speed and pressure conditions at the interface between the two discs (braking simulation);

| conditions | number of stops | initial speed | pressure |
| --- | --- | --- | --- |
| a | 100 | 1300 revs/mn | 0.6 MPa |
| b | 100 | 3000 revs/mn | 0.8 MPa |
| c | 100 | 3500 revs/mn | 0.8 MPa |
| d | 20 | 4000 revs/mn | 1.5 MPa |
| e | 5 | 4500 revs/mn | 2.1 MPa |

The average wear was measured for each disc face and for each stoppage. The values denoting wear are given without any unit: the value denoting wear 1 on the brake disc of test 1 was given randomly with the testing conditions "a", the other values denoting wear being proportional.

| | No. of Test | | |
| --- | --- | --- | --- |
| Conditions | 1 | 2 | 3 |
| a | 1 | 0.5 | 0.2 |
| b | 1.15 | 4 | 0.4 |
| c | 1.3 | 20 | 0.6 |
| d | 5 | — | 3 |
| e | 10 | — | 5 |

Thus, if the study of low wear under low energy stoppage conditions which by very far are the conditions most frequently found with aeroplanes, the brakes according to the invention (test 3) are of high performance.

It can be seen that the brake in test 2 responds very well to wear with low energy, but there is a very sharp drop in this performance which is crippling once the energy used for the braking increases (that is to say towards less frequent, but not exceptional, energy levels). According to one hypothesis put forward by the Applicant, the very poor performance of the brakes in test 2 on the scale of wear is to be attributed to the presence of large solid carbon particles in the large sized cavities. On the other hand, the distinct advantage can be seen of dividing up the coarse porosities (large sized cavities) which result in a porosity divided up by walls, the main feature of the invention which distinguishes it from the prior art.

In conclusion, the tests show that the invention combines the advantages of the brakes of tests 1 and 2 of the prior art and permits a low degree of wear to be achieved both in the domain of braking with high and low energy levels, whereas the prior art only permitted one or the other.

As far as mechanical characteristics are concerned, the resilience was measured (measurement with a Charpy punch) of the C-C composite materials obtained in Examples 1 to 3. Close values were obtained for resilience of between 13 and 25 $kJ/m^2$. These values are to be compared with the values obtained with the tests carried out as comparisons for tests 1 to 3, but where the fibrous substrate of coarse texture was replaced by a fibrous substrate of fine texture (dull surface of individual fibres). A substrate of fine texture gave resilience values of between 1 and 3 $kJ/m^2$, that is to say values which are typically 10 times less than those obtained with a substrate of coarse structure.

As far as the stability of the coefficient of friction during braking is concerned, it has typically been noted that with the C-C composite material of Example 3 according to the invention, a ratio of 1.3 to 1.5 between the maximum coefficient and the mean coefficient is observed during one and the same braking operation, on the one hand, and that a variation in the mean coefficient of friction was observed by a factor of 1.8 between the conditions "a" and "e", on the other hand. However, the materials of tests 1 and 2 according to the prior art, a ratio is observed of 1.5 between the maximum coefficient and the mean coefficient during one and the same braking operation, but a considerable variation (x 2,3) is to be seen between the conditions "a" and "e".

Comparative tests are also carried out for tests 1 to 3, but without a heat treatment beyond 1600° C. In this case, under low energy braking conditions, a greater stability in the coefficient of friction is seen in the case of fiction materials according to the invention. On the other hand, when used under high energy braking conditions, all these materials (tests 1 to 3 but not subjected to heat treatments) have a very high degree of wear.

In conclusion, when compared with the prior art, the brakes obtained according to the invention offer good resistance to wear within a very wide energy range, with small differences in the coefficient of friction between high and low energy braking conditions and with good couple stability during one and the same braking operation. It was not possible to obtain all these performances with the prior art products and processes.

ADVANTAGES OF THE INVENTION

In addition to the advantages linked with the performance of C-C composite materials according to the invention, as mentioned hereinabove, the invention also has advantages with respect to the manufacturing process. In fact, it is first of all particularly advantageous to be able to manufacture a friction material solely by using a substrate of coarse texture, for the initial partial densifying by depositing pyrocarbon on a substrate of coarse texture is particularly economical, access to the core of the substrate being very good (existence of large sized cavities) and permitting high depositing speeds of the pyrocarbon without any risk of encrustation at the surfaces and formation of gradients of very significant density between the surface and the core of the material.

On the other hand, the pre-existence of a divided support (10) (core) at the moment when pyrocarbon is being deposited for a second time, which is intended to form the walls of said cellular structure, provides a very large specific surface area which promotes rapid formation of bulk (formation of pyrocarbon), typically twice as fast as when there is no divided support (10) forming said core.

What is claimed is:

1. A carbon-carbon composite material comprising:
   a) a fibrous substrate consisting essentially of a carbon fiber base which acts as a reinforcement, said fibrous substrate having a coarse texture and large sized cavities; and
   b) a matrix comprising:
      1) pyrocarbon layers coating the cavities of said fibrous substrate, and
      2) a carbon based cellular structure dividing said large sized cavities into small cavities having open porosity, said cellular structure comprising a core portion of a non-oriented carbon based material, and a surface portion of an oriented material of the pyrocarbon type which is joined to said coating layers.

2. A material according to claim 1, in the form of a brake disc.

3. A material according to claim 2, which is graphited.

4. A material according to claim 1, wherein said non-oriented material, is a product of carbonization of a carbon-rich resin, a pitch, a heavy hydrocarbon or a film-forming substance.

5. A material according to claim 1 or 4, having a composition, in % by volume:
   fibrous substrate: between 20 and 40;
   pyrocarbon coating: between 40 and 60;
   carbon based cellular structure: between 5 and 20; and
   residual porosity: between 5 and 15.

6. A material according to claim 1 or 4, wherein said fibrous substrate is constituted of carbon fiber roves containing more than 1000 filaments, the roves being either in the form of fabric, or in the form of said roves cut to lengths greater than 3 mm and distributed at random, the intersections of the roves or accumulations of the roves resulting in porosities of an area which is at least equal to $10^{-1}$ $mm^2$.

7. A material according to claim 6, wherein said coating layers have a thickness between 50 and 100 µm, and said cellular structure has walls which are between 10 and 60 µm in thickness.

8. A material according to claim 7, wherein said small cavities have a mean area in cross-section of between $10^{-2}$ and $10^{-1}$ $mm^2$.

9. A material according to claim 1 or 4, wherein said carbon matrix is graphited.

10. A carbon-carbon composite material comprising:
    a) a fibrous substrate consisting essentially of a carbon fiber base which acts as a reinforcement, said fibrous substrate having a coarse texture and large sized cavities of mean cross-sectional area of at least $10^{-1}$ mm$^2$;

b) a matrix comprising a pyrocarbon layer of thickness 50 to 100 µm coating the cavities of the fibrous substrate, and a carbon based cellular structure comprising a core portion having walls 10 to 60 µm in thickness dividing said large sized cavities into small cavities having a mean cross-sectional area between $10^{-2}$ and $10^{-1}$ mm$^2$, and a surface portion of an oriented carbon based material of the pyrocarbon type which is joined to the pyrocarbon layer, and leaving a residual porosity in said composite material of 5–15 vol. %.

* * * * *